(12) United States Patent
Cheng et al.

(10) Patent No.: US 10,457,604 B2
(45) Date of Patent: Oct. 29, 2019

(54) MICRO-NANO COMPOSITE HOLLOW STRUCTURED NANOMETER MATERIAL-MODIFIED HIGH-DURABILITY CONCRETE MATERIAL AND PREPARATION METHOD THEREOF

(71) Applicant: University of Jinan, Jinan (CN)

(72) Inventors: Xin Cheng, Jinan (CN); Ning Xie, Jinan (CN); Lichao Feng, Jinan (CN); Pengkun Hou, Jinan (CN); Zonghui Zhou, Jinan (CN); Qinfei Li, Jinan (CN)

(73) Assignee: University of Jinan, Shandong Province (CN)

( * ) Notice: Subject to any disclaimer, the term of this patent is extended or adjusted under 35 U.S.C. 154(b) by 0 days.

(21) Appl. No.: 15/965,835

(22) Filed: Apr. 27, 2018

(65) Prior Publication Data

US 2019/0135700 A1    May 9, 2019

(30) Foreign Application Priority Data

Nov. 9, 2017    (CN) .......................... 2017 1 10969496

(51) Int. Cl.
| | |
|---|---|
| *C04B 28/28* | (2006.01) |
| *C04B 14/38* | (2006.01) |
| *C04B 14/30* | (2006.01) |
| *C04B 28/18* | (2006.01) |
| *B82Y 30/00* | (2011.01) |
| *C04B 111/00* | (2006.01) |

(52) U.S. Cl.
CPC .............. *C04B 28/28* (2013.01); *C04B 14/30* (2013.01); *C04B 14/386* (2013.01); *C04B 28/184* (2013.01); *B82Y 30/00* (2013.01); *C04B 2111/00008* (2013.01); *C04B 2235/422* (2013.01)

(58) Field of Classification Search
CPC ....... C04B 14/30; C04B 14/386; C04B 28/28; C04B 28/141; C04B 2111/00008; C04B 2235/422; B82Y 30/00
See application file for complete search history.

(56) References Cited

U.S. PATENT DOCUMENTS 8,092,592 B2 *  1/2012  Buerge ................. C04B 24/003
                                                          106/717

FOREIGN PATENT DOCUMENTS

CN          107686291 A   *   2/2018

* cited by examiner

*Primary Examiner* — Anthony J Green
(74) *Attorney, Agent, or Firm* — Liu Law Office; Helen S. Liu

(57) ABSTRACT

The present invention discloses a micro-nano composite hollow structured nanometer material-modified high-durability concrete material, and according to mass parts, its raw material formula is as follows: cobaltosic oxide, 1000-1500 parts; cement, 1000-1300 parts; dioctyl sebacate, 1000-1500 parts; water, 800-1200 parts; nanocarbon, 1200-1800 parts; nano calcium carbonate, 35-50 parts; sodium silicate, 10-20 parts; micro-nano structured calcium molybdate, 50-80 parts; dipentaerythritol, 60-90 parts; and dioctyl ester 30-60 parts. The present invention enables existing concrete to be improved effectively and stably in terms of shrinkage, cracking resistance and rapid hardening; the synthetic chemical functional material may lower a chloride ion diffusion coefficient of the concrete by more than 50%, cut down shrinkage by more than 30%, and reduce the cracking risk of concrete products by 50%.

5 Claims, 2 Drawing Sheets

MICRO-NANO COMPOSITE HOLLOW STRUCTURED NANOMETER MATERIAL-MODIFIED HIGH-DURABILITY CONCRETE MATERIAL AND PREPARATION METHOD THEREOF

TECHNICAL FIELD

The present invention relates to a micro-nano composite hollow structured nanometer material-modified high-durability concrete material and a preparation method thereof.

BACKGROUND

With the rapid social and economic development in our country, the urbanization drive speeds up with each passing year, and amounts of infrastructure construction have reached to an unprecedented scale. Owing to their good overall performances and relatively low costs, concrete products have been widely applied to such fields as civil engineering, hydraulic engineering, harbors, bridges and roads. However, while concrete techniques have been widely applied at present, and concrete strength has been improved, the drawbacks of high energy consumption, high carbon emissions and inadequate durability under harsh conditions existing in the concrete industry remain to be the major issues facing the world today. Therefore, how to effectively reduce energy consumption of concrete products and improve their rapid hardening, shrinkage resistance, cracking resistance and durability under harsh conditions has been the focus of current researches.

With the development of nanotechnology, recent years have seen rapid development on many researches on self-assembled micro-nano composite superstructured functional materials, and their applications may endow numerous traditional materials with superior overall synergistic performances. Through simple manipulation over their dimensions and geometry appearances, nano-particles are self-assembled as a one-dimensional, two-dimensional or three-dimensional ordered structure; thereafter, novel overall synergistic characteristics may be obtained. Moreover, interactions among nano-particles may be controlled to regulate their nature. Consequently, these newly-emerging novel micro-nano composite superstructured functional materials will have positive promotion effects on performance optimization of concrete.

Currently, micro-nano composite hollow microsphere superstructures, which have such advantages as low densities, high specific surface areas and good monodispersity, and can accommodate other materials in their hollow portions, have become the frontier and focus of research in nanometer material science, chemistry, physics and bioscience. In a hollow microsphere superstructure, the spherical shell of the hollow microsphere is comprised of nanorods/nanosheets arranged in a radial direction. Nano-sized "channels" are present among these nanorods/nanosheets, and these channels provide effective transmission ways for the exchange between hollow portions and external substances. When a micro-nano composite hollow superstructured material is combined with concrete, as hollow structures may store some moisture required by hydration of concrete, some of the water will be slowly released from the inside to the concrete along nano-sized "channels" on spherical shells of hollow spheres, thus changing the hydration process of cement concrete members. As such, conditions may be created for internal curing of cement concrete. Under the conditions of internal curing, the hydration degree of cement concrete will be improved, problems of early cracking will be alleviated, and strength and toughness of concrete will be enhanced.

SUMMARY OF THE INVENTION

The technical problem to be solved by the present invention is to overcome the existing drawbacks and provide a micro-nano composite hollow structured nanometer material-modified high-durability concrete material, and according to mass parts, the raw material formula of the above concrete material is as follows:

cobaltosic oxide, 1000-1500 parts; cement, 1000-1300 parts; dioctyl sebacate, 1000-1500 parts; water, 800-1200 parts; nanocarbon, 1200-1800 parts; nano calcium carbonate, 35-50 parts; sodium silicate, 10-20 parts; micro-nano structured calcium molybdate, 50-80 parts; dipentaerythritol, 60-90 parts; and dioctyl ester 30-60 parts.

Further, according to mass parts, the raw material formula of the micro-nano composite hollow structured nanometer material-modified high-durability concrete material is as follows:

cobaltosic oxide, 1200 parts; cement, 1000 parts; dioctyl sebacate, 1200 parts; water, 1000 parts; nanocarbon, 1500 parts; nano calcium carbonate 40-45 parts; sodium silicate, 15 parts; micro-nano structured calcium molybdate, 60-70 parts; dipentaerythritol, 70-85 parts; and dioctyl ester, 40-50 parts.

Preferably, according to mass parts, the raw material formula of the micro-nano composite hollow structured nanometer material-modified high-durability concrete material is as follows:

cobaltosic oxide, 1000 parts; cement, 1000 parts; dioctyl sebacate, 1000 parts; water, 800 parts; nanocarbon, 1200 parts; nano calcium carbonate 35 parts; sodium silicate, 10 parts; micro-nano structured calcium molybdate, 50 parts; dipentaerythritol, 60 parts; and dioctyl ester, 30 parts.

Preferably, according to mass parts, the raw material formula of the micro-nano composite hollow structured nanometer material-modified high-durability concrete material is as follows:

cobaltosic oxide, 1500 parts; cement, 1300 parts; dioctyl sebacate, 1500 parts; water, 1200 parts; nanocarbon, 1800 parts; nano calcium carbonate 50 parts; sodium silicate, 20 parts; micro-nano structured calcium molybdate, 80 parts; dipentaerythritol, 90 parts; and dioctyl ester, 60 parts.

Another aspect of the present invention discloses a method for preparing a micro-nano composite hollow structured nanometer material-modified high-durability concrete material, and the method comprises the following steps:

1) cobaltosic oxide, nanocarbon, cement, dioctyl sebacate, nano calcium carbonate, water, sodium silicate and dipentaerythritol are added according to proportions to obtain a mixture; and 2) the remaining components are added, and the mixture is delivered into a high-speed kneader where it is kneaded for 6-15 minutes at the temperature of 110-150 DEG C.; after a kneaded material is cooled, it is delivered into a twin-screw extruder for granulation to obtain the micro-nano composite hollow structured nanometer material-modified high-durability concrete material.

The beneficial effects attained by the present invention are as follows:

dioctyl sebacate is chiefly used in such products as polyvinyl chloride cold-resistant films and artificial leather. It may also be used as plasticizer for multiple rubber, cellulose nitrate, ethyl cellulose, polymethyl methacrylate, polystyrene, vinyl chloride-vinyl acetate copolymers, etc. Dioctyl sebacate has the advantages of high plasticization efficiency and low volatility, which has not only excellent cold resistance, but also good heat resistance, light resistance and electrical insulation. It is used in concrete for the first time. Dipentaerythritol may be used as stainless steel color plate and advanced granite spraying surface film, which has such excellent performances as strong adhesion, abrasion resistance and aging resistance. In the present invention, with the optimization on their adulteration proportion, dioctyl sebacate and dipentaerythritol present better synergistic effects in ultra-high-strength concrete, wherein expansion performances are stable, and expansion develops in synergy with the shrinkage and strength of concrete.

In the present invention, cobaltosic oxide, sodium silicate, nano calcium carbonate and micro-nano structured calcium molybdate are employed to prepare the micro-nano composite hollow structured nanometer material-modified high-durability concrete material, which enables existing concrete to be improved effectively and stably in terms of shrinkage, cracking resistance and rapid hardening. The synthetic chemical functional material may lower the chloride ion diffusion coefficient of concrete by more than 50%, cut down shrinkage by more than 30%, and reduce the cracking risk of concrete products by 50%.

BRIEF DESCRIPTION OF THE DRAWINGS

The accompanying drawings are used for providing a further understanding of the present invention, and constitute a portion of the description. They are used in combination with the embodiments of the present invention to explain the present invention, but do not constitute any limitations on the present invention.

FIGS. 1a and 1b illustrate a scanning electron microscopic morphology and a transmission electron microscopic morphology of a micro-nano composite hollow superstructured chemical functional material; wherein FIG. 1a is the transmission electron microscopic morphology, and FIG. 1b is the scanning electron microscopic morphology.

DETAILED DESCRIPTION OF THE INVENTION

Figure 1A:
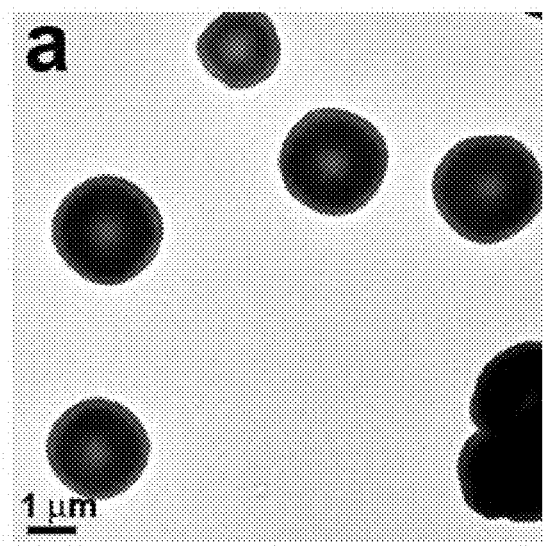

Preferred embodiments of the present invention will be illustrated below in combination with the accompanying drawings. It should be appreciated that the preferred embodiments described herein are only for the purpose of illustrating and explaining the present invention, and not intended to limit the present invention.

Embodiment 1

A micro-nano composite hollow structured nanometer material-modified high-durability concrete material was provided, and according to mass parts, its raw material formula was as follows:

cobaltosic oxide, 1000 parts; cement, 1000 parts; dioctyl sebacate, 1000 parts; water, 800 parts; nanocarbon, 1200 parts; nano calcium carbonate 35 parts; sodium silicate, 10 parts; micro-nano structured calcium molybdate, 50 parts; dipentaerythritol, 60 parts; and dioctyl ester, 30 parts.

The above-mentioned micro-nano composite hollow structured nanometer material-modified high-durability concrete material was prepared using the method comprising the following steps:

1) cobaltosic oxide, nanocarbon, cement, dioctyl sebacate, nano calcium carbonate, water, sodium silicate and dipentaerythritol were added according to proportions to obtain a mixture; and 2) the remaining components were added, and the mixture was delivered into a high-speed kneader where it was kneaded for 6-15 minutes at the temperature of 110-150 DEG C.; after a kneaded material was cooled, it was delivered into a stirring machine for stirring; then, water was slowly added to a mixed material while stirring; 180-240 seconds after stirring, an ultra-micro-nano composite hollow structured nanometer material-modified high-durability concrete material was obtained.

Embodiment 2

A micro-nano composite hollow structured nanometer material-modified high-durability concrete material was provided, and according to mass parts, its raw material formula was as follows:

cobaltosic oxide, 1500 parts; cement, 1300 parts; dioctyl sebacate, 1500 parts; water, 1200 parts; nanocarbon, 1800 parts; nano calcium carbonate 50 parts; sodium silicate, 20 parts; micro-nano structured calcium molybdate, 80 parts; dipentaerythritol, 90 parts; and dioctyl ester, 60 parts.

The above-mentioned micro-nano composite hollow structured nanometer material-modified high-durability concrete material was prepared using the method comprising the following steps:

1) cobaltosic oxide, nanocarbon, cement, dioctyl sebacate, nano calcium carbonate, water, sodium silicate and dipentaerythritol were added according to proportions to obtain a mixture; and 2) the remaining components were added, and the mixture was delivered into a high-speed kneader where it was kneaded for 6-15 minutes at the temperature of 110-150 DEG C.; after a kneaded material was cooled, it was delivered into a stirring machine for stirring; then, water was slowly added to a mixed material while stirring; 180-240 seconds after stirring, an ultra-micro-nano composite hollow structured nanometer material-modified high-durability concrete material was obtained.

Testing Methods:

The microstructure of the concrete added with micro-nano composite superstructured chemical functional materials is analyzed as follows:

an atomic force microscope (AFM) is employed to observe the surface roughness of the concrete, thereby representing the uniformity of its microstructure; a scanning electron microscope (SEM/EDX/EBSD) is employed to observe the fracture morphology of the concrete in addition to pore structure, pore distribution, chemical components of hydrated products, morphology features and distribution characteristics of structural components; a nanohardness tester is employed to calculate the microscopic elastic modulus and the microscopic toughness of each component in the concrete.

Analysis approaches, such as transmission electron microscopes (TEM/EDX), high-resolution electron microscopes (HREM), X-ray diffraction (XRD) and X-ray photoelectron spectrometers (XPS), are employed to represent the microstructure, phase composition, element distribution and so on of the concrete after hydration.

Figure 1B:
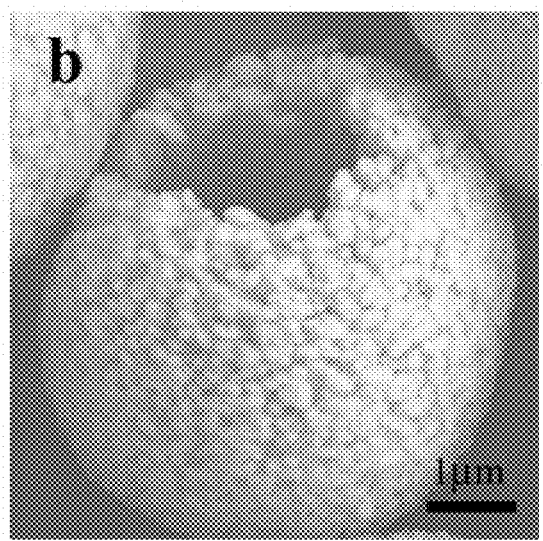

FIGS. 1a and 1b illustrate the scanning electron microscopic morphology and the transmission electron microscopic morphology of the micro-nano composite hollow superstructured chemical functional material synthesized using the present method. FIG. 1a is the transmission electron microscopic morphology, and FIG. 1b is the scanning electron microscopic morphology. As can be seen from FIGS. 1a and 1b, the synthesized material is a micro-nano composite superstructured chemical functional material formed by the self-assembly of nanorods having a diameter of 50 nm and a length of 100 nm.

Figure 2A:
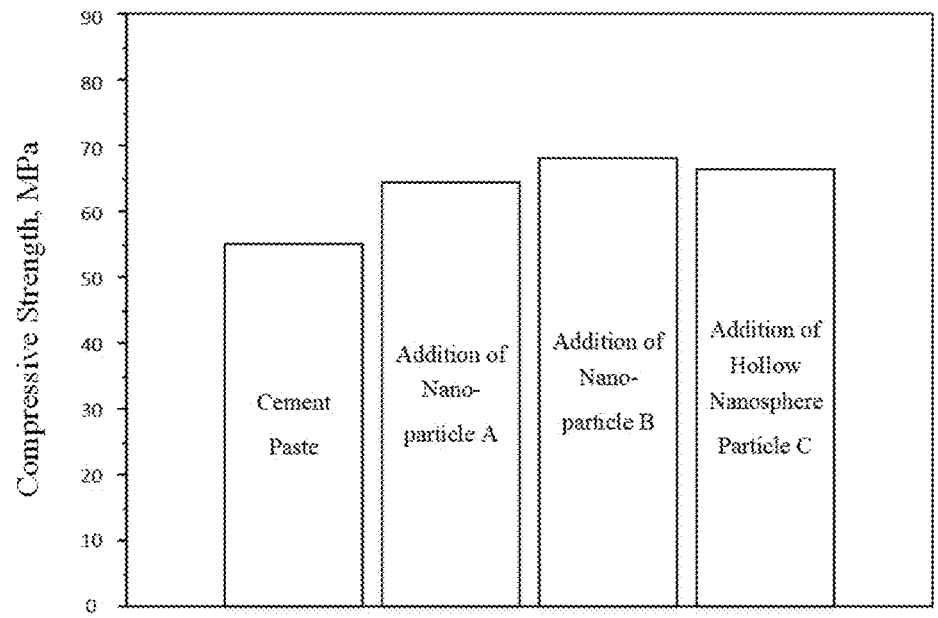
FIG. 2a is a comparison diagram illustrating the compressive strength of cement paste after addition of nano-particles and hollow nanosphere particles.
Figure 2B:
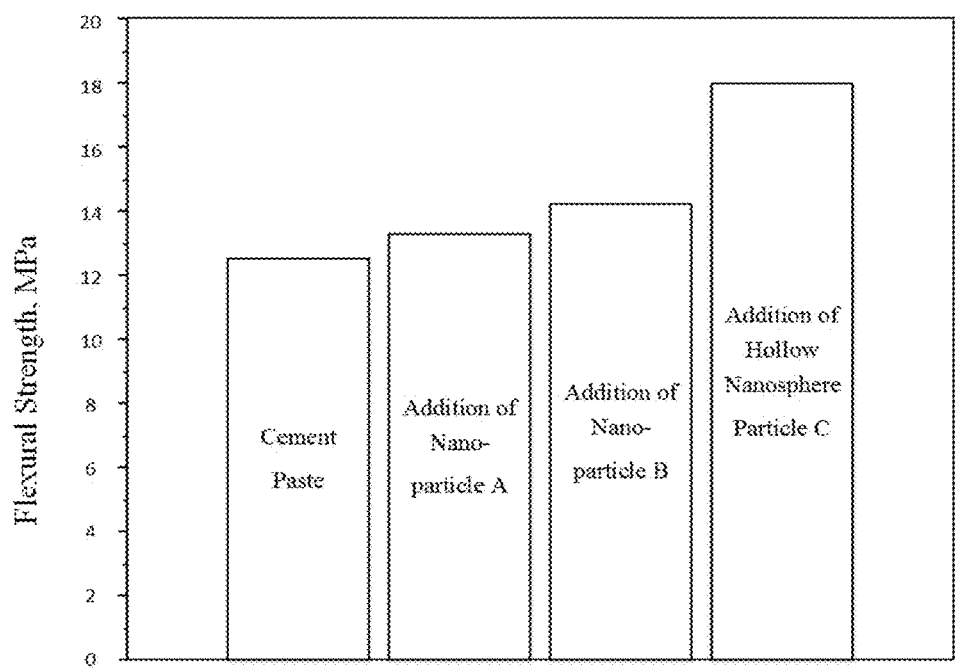
FIG. 2b is a comparison diagram illustrating the flexural strength of cement paste after addition of nano-particles and hollow nanosphere particles.

The micro-nano composite hollow superstructured chemical functional material enhances the mechanical properties of the cement paste:

FIGS. 2a and 2b are a comparison diagram illustrating the compressive strength and the flexural strength of the cement paste after addition of nano-particles and hollow nanosphere particles. As can be seen from FIG. 2a, the average value for the compressive strength of the cement paste is 57.4 MPa. After addition of the nanometer material, the compressive strength of the cement paste is somewhat improved by about 20% on a stable level. The compressive strength of the cement paste added with hollow nanosphere particles is 67.0 MPa. As can be seen from FIG. 2b, the average value for the flexural strength of the cement paste is 12.3 MPa, and the addition of a small amount of the nanometer material may effectively improve the flexural strength of the cement paste. Here, the addition of hollow nanosphere particles may improve the flexural strength of cement by about 40%. In FIGS. 2a and 2b, nano-particle A is nanocarbon; nano-particle B is nano calcium carbonate; hollow nanosphere particle C is micro-nano structured calcium molybdate.

Finally, it should be illustrated that what have been described above are merely preferred embodiments of the present invention, and not intended to limit the present invention. Although the present invention has been illustrated in detail with reference to the aforesaid embodiments, for those skilled in the art, they still can make modifications to the technical solutions recorded in the various embodiments mentioned above or replace some technical features in the technical solutions with equivalent ones. Any modifications, equivalents, improvements and so on that fall within the spirit and principle of the present invention shall be covered by the scope of protection of the present invention.

The invention claimed is:

1. A micro-nano composite hollow structured nanometer material-modified high-durability concrete material, characterized in that, according to mass parts, its raw material formula is as follows: cobaltosic oxide, 1000-1500 parts; cement, 1000-1300 parts; dioctyl sebacate, 1000-1500 parts; water, 800-1200 parts; nanocarbon, 1200-1800 parts; nano calcium carbonate, 35-50 parts; sodium silicate, 10-20 parts; micro-nano structured calcium molybdate, 50-80 parts; dipentaerythritol, 60-90 parts; and dioctyl ester 30-60 parts.

2. The micro-nano composite hollow structured nanometer material-modified high-durability concrete material according to claim 1, characterized in that, according to mass parts, its raw material formula is as follows:
cobaltosic oxide, 1200 parts; cement, 1000 parts; dioctyl sebacate, 1200 parts; water, 1000 parts; nanocarbon, 1500 parts; nano calcium carbonate 40-45 parts; sodium silicate, 15 parts; micro-nano structured calcium molybdate, 60-70 parts; dipentaerythritol, 70-85 parts; and dioctyl ester, 40-50 parts.

3. The micro-nano composite hollow structured nanometer material-modified high-durability concrete material according to claim 1, characterized in that, according to mass parts, its raw material formula is as follows:
cobaltosic oxide, 1000 parts; cement, 1000 parts; dioctyl sebacate, 1000 parts; water, 800 parts; nanocarbon, 1200 parts; nano calcium carbonate 35 parts; sodium silicate, 10 parts; micro-nano structured calcium molybdate, 50 parts; dipentaerythritol, 60 parts; and dioctyl ester, 30 parts.

4. The micro-nano composite hollow structured nanometer material-modified high-durability concrete material according to claim 1, characterized in that, according to mass parts, its raw material formula is as follows:
cobaltosic oxide, 1500 parts; cement, 1300 parts; dioctyl sebacate, 1500 parts; water, 1200 parts; nanocarbon, 1800 parts; nano calcium carbonate 50 parts; sodium silicate, 20 parts; micro-nano structured calcium molybdate, 80 parts; dipentaerythritol, 90 parts; and dioctyl ester, 60 parts.

5. A method for preparing the micro-nano composite hollow structured nanometer material-modified high-durability concrete material according to claim 1, characterized in that the method comprises the following steps:
1) adding cobaltosic oxide, nanocarbon, cement, dioctyl sebacate, nano calcium carbonate, water, sodium silicate and dipentaerythritol according to proportions to obtain a mixture; and
2) adding other remaining components, and delivering the mixture into a high-speed kneader for kneading for 6-15 minutes at a temperature of 110-150 DEG C.; after a kneaded material is cooled, delivering the kneaded material into a stirring machine for stirring; and then, slowly adding water to a mixed material while stirring, and stirring for 180-240 seconds to obtain an ultra-micro-nano composite hollow structured nanometer material-modified high-durability concrete material.

\* \* \* \* \*